United States Patent [19]

Fowler

[11] 4,419,953
[45] Dec. 13, 1983

[54] APPARATUS FOR APPLYING SEASONING
[75] Inventor: David P. Fowler, Irving, Tex.
[73] Assignee: Frito-Lay, Inc., Dallas, Tex.
[21] Appl. No.: 386,350
[22] Filed: Jun. 8, 1982
[51] Int. Cl.³ ............................................. B05C 19/00
[52] U.S. Cl. ........................................ 118/16; 118/19; 118/20; 118/24
[58] Field of Search ...................... 118/24, 25, 21, 20, 118/308, 16, 19; 239/654, 298, 296, 292, 300

[56] References Cited
U.S. PATENT DOCUMENTS

| | | |
|---|---|---|
| 813,680 | 2/1906 | Vicars et al. |
| 825,381 | 7/1906 | Coleman |
| 1,333,079 | 3/1920 | Kaufmann |
| 2,119,910 | 6/1938 | Ferry ............................................ 118/16 |
| 2,655,897 | 10/1953 | Thompson ...................... 118/24 X |
| 3,045,640 | 7/1962 | Hill et al. ......................... 118/24 X |
| 3,478,969 | 11/1969 | Lund ............................... 427/180 X |
| 3,572,287 | 3/1971 | Saito .................................. 118/629 |
| 4,044,714 | 8/1977 | Jones et al. ............................ 118/24 |
| 4,045,584 | 8/1977 | Jones et al. ............................ 118/24 |
| 4,064,295 | 12/1977 | Singer ................................. 427/424 |
| 4,210,074 | 7/1980 | Laughman ........................... 99/494 |
| 4,212,266 | 7/1980 | Payne et al. ......................... 118/712 |

Primary Examiner—John P. McIntosh
Attorney, Agent, or Firm—Bernard, Rothwell & Brown

[57] ABSTRACT

Seasoning is applied uniformly to an edible snack product and excess seasoning is reapplied by directed streams of air. A rotary helical wire feeder in a tube having a variable width slotted outlet is provided with a chamber for directing an air flow along the outside of the tube on opposite sides of the outlet to control the distribution of a curtain of seasoning falling from the tube outlet. Seasoning which misses the snacks on an open conveyor is collected underneath the conveyor and reapplied to the bottom of the snacks by air flowing over the surface of collectors.

13 Claims, 4 Drawing Figures

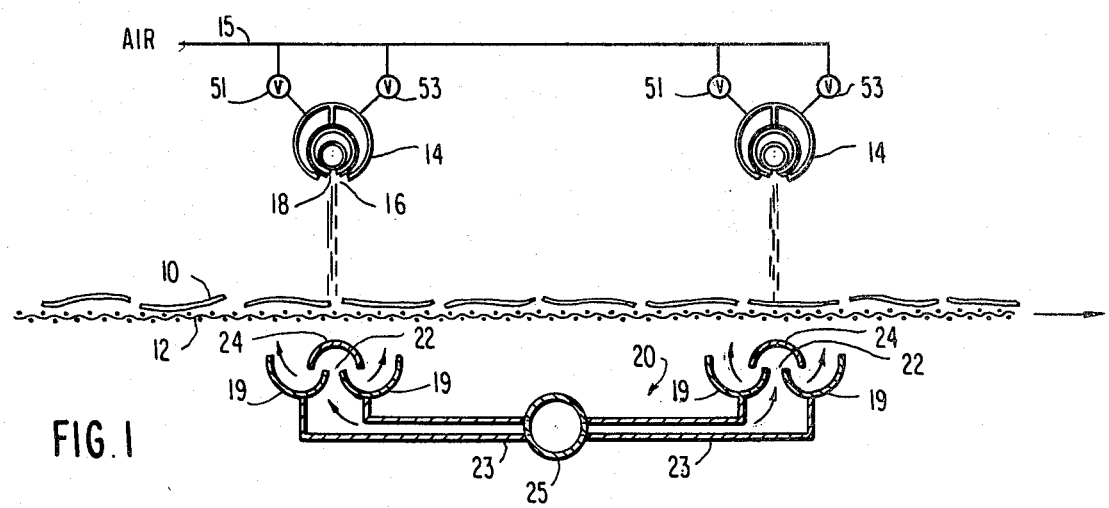
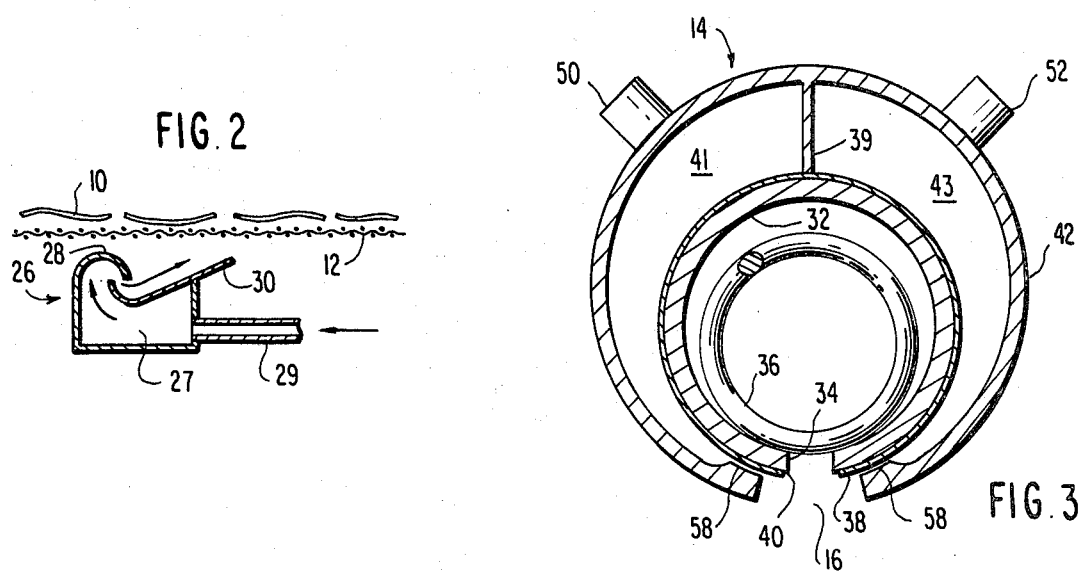
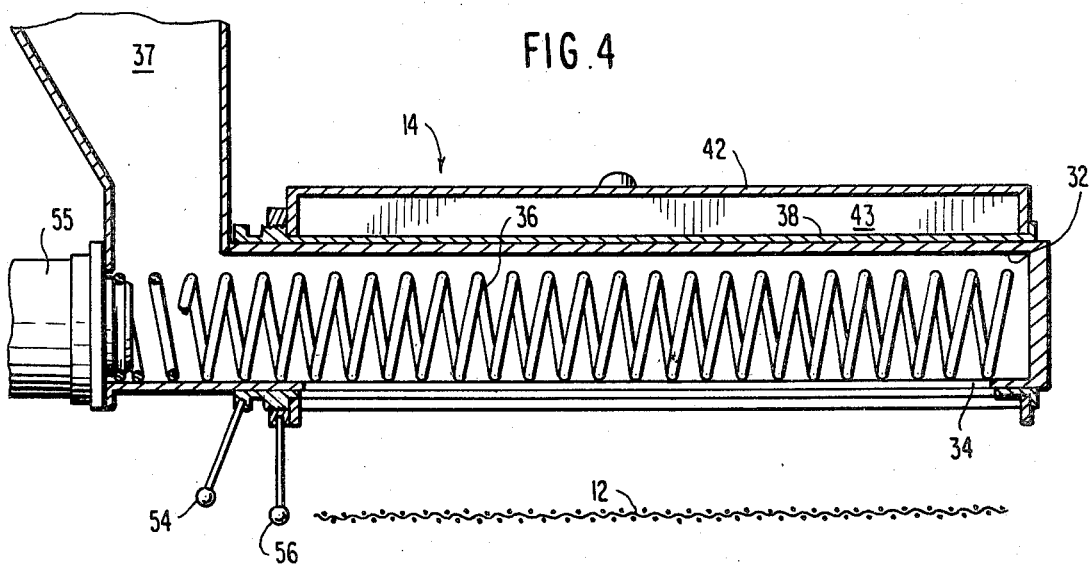

4,419,953

APPARATUS FOR APPLYING SEASONING

BACKGROUND OF THE INVENTION

1. Field of the Invention

This invention relates to improvements in apparatus for controllably applying seasoning onto an edible snack product.

2. Prior Art

To obtain a flavored snack product, the desired seasoning is generally deposited on the surface of the snack product after cooking. Obtaining a uniform and controlled distribution of seasoning on the product, and preferably on all sides of the snack product, is highly desirable since it enhances the taste and commercial acceptability of the snack.

Present methods for distributing seasoning onto snacks include tumbling the snacks in the presence of seasoning, sprinkling seasoning on snacks as they pass under a seasoner, making multiple passes over the snacks with a seasoner and methods relying on electrostatic charges to coat the seasoning onto the snacks. Equipment for such processes may include rotating wire mesh cylinders, high speed impellers for distributing the seasoning or equipment for generating electrostatic charges, or simple elongated sprinkling tubes. These arrangements often result in breakage of the snack product or do not provide a consistently uniform distribution of seasoning over irregularly-shaped snack products such as potato chips. These methods and the required equipment can be expensive to install and operate.

There is a need in the art for controllably and uniformly distributing seasoning on snack products in one pass without losing significant amounts of seasoning.

SUMMARY OF THE INVENTION

This invention provides an apparatus for distributing seasoning controllably and uniformly onto a snack product, utilizing directed streams of air to controllably distribute the seasoning. When the seasoning is sprinkled toward the snack product from above, controlled air currents are directed from the sides of the sprinklers to produce a zone of turbulence in the curtain of falling seasoning to disperse the seasoning, creating a broad and uniform curtain of seasoning falling onto the snack product. Currents of air are also provided below the snack product to direct the excess of the fallen seasoning upwardly into contact with the bottom surface of the snack product. These pneumatic assists provide a uniform coating of seasoning on both sides of said snack product.

BRIEF DESCRIPTION OF THE DRAWINGS

FIG. 1 is a schematic elevation view of the seasoning applicator of this invention.

FIG. 2 is a schematic elevation view of a modification of the lower seasoning return shown in FIG. 1.

FIG. 3 is an enlarged transverse sectional view of the upper seasoning applicator shown in FIG. 1.

FIG. 4 is a longitudinal sectional view of the upper seasoning applicator shown in FIG. 3.

DETAILED DESCRIPTION OF THE PREFERRED EMBODIMENT

In the embodiment of the invention as illustrated in FIG. 1, seasoning is distributed onto a snack product 10, such as potato chips, which are carried on a moving mesh conveyor 12, in an essentially (but not necessarily completely) monolayered condition. The conveyor may be a vibrating wedgwire material or other suitable device for supporting and conveying the snack product and allowing seasoning which misses the snack product to fall below the conveyor. If the snack product is potato chips, they are preferably monolayered to enhance seasoning distribution. Since potato chips are irregularly shaped, some seasoning misses the potato chips and passes through the mesh conveyor.

The conveyor 12 brings the products 10 to be seasoned beneath an upper seasoning applicator 14. An embodiment of the upper seasoning applicator is shown in more detail in FIGS. 3 and 4. Each upper applicator includes valves 51, 53 for regulating the flow of compressed air from line 15 to the upper applicator 14. Each valve 51 and 53 operates independently of the other to supply the upper applicator with compressed air of desired pressure to create a controlled zone of turbulence 16 immediately below a seasoning outlet 18 by streams of directed air. The seasoning particles are fed out of upper applicator 14 through seasoning outlet 18 and contact the zone of turbulence 16. The zone of turbulence is produced by intersecting streams of compressed air which may be moving at the same or at different velocities depending on the pressure selected under the control of valves 51, 53. The air flow and curved surfaces of the upper applicator, described in more detail below, produce what is known as a coanda effect which causes the compressed air to follow and hug curved surfaces. This results in the desired zone of turbulence being produced immediately below the seasoning outlet 18. The zone of turbulence produces a curtain of seasoning that rains down on the snack products 10 to give each one a uniform covering of seasoning on their top surface.

Seasoning particles which do not contact the surface of the spaced products 10 fall through the interstices or openings in the conveyor 12 into lower seasoning applicator or seasoning return 20, illustrated in FIG. 1. Seasoning return 20 includes two U-shaped troughs 19 which collect seasoning that has missed the snack product and fallen through the conveyor. A cover 24 is positioned above space 22 between the adjacent walls of the troughs to prevent seasoning from falling into the space 22, to direct seasoning into either trough 19 and to deflect air moving up through the space 22 down into the U-shaped troughs. Air under pressure is supplied to each seasoning return from any suitable source 25 through manifolds 23. A coanda effect is created by the curved surfaces and the air flow which results in the air hugging the curved surfaces. Because of this coanda effect, the contoured walls of the trough direct the air and the excess seasoning in the trough carried by the air, upward towards, and into contact with, the undersurface of the snack. In this manner, both sides of the snack product contained on the mesh carrier are covered in a single pass without tumbling action which may be destructive to the snack itself. By using compressed air and the coanda effect in this manner, seasoning is distributed uniformly over all surfaces of the snack product substantially simultaneously.

A second embodiment of a lower seasoning applicator or seasoning return is illustrated in FIG. 2. A seasoning return 26 includes an air plenum 27. A plenum cover 28 is an integral part of or attached directly to the body of the seasoning return 26 forming the air plenum 27.

Air under pressure is introduced into the plenum 27 through line 29. Trough 30 is an integral part of or attached directly to the plenum 27 and in the shape of a rounded L to direct air deflected by the plenum cover 28 in a more horizontal direction than the embodiment illustrated in FIG. 1. The coanda effect causes the air to hug the curved surface of the trough 30 and the directed air thereby forces the seasoning collected in the trough 30 upward against the underside of snack product 10.

In both embodiments the length of the seasoning return below the conveyor and the length of the upper seasoning applicator above the conveyor are approximately equal to the width of the conveyor so that they extend transversely across the width of the product 10 on the conveyor 12.

A specific embodiment of the upper seasoning applicator 14 for use in seasoning snack products is illustrated in more detail in FIGS. 3 and 4. A seasoning tube 32 is provided with holes or a slit opening 34 which runs the length of the tube. The seasoning tube is preferably a heavy walled tube. A rotatable hollow wire helix 36 is provided within the conduit to move the seasoning through the conduit and to prevent build-up of the seasoning. A slit width adjusting tube, 38, preferably a thin walled tube, fits closely around and substantially surrounds the seasoning conduit without closing off the slit 34. The adjusting tube 38 is also provided with an opening 40 which corresponds to the slit 34 in the seasoner tube 32 to allow seasoning to fall therethrough into the zone of turbulence 16.

A slotted outer tube, 42, substantially surrounds the adjusting tube 38 and has a dividing wall 39 to form two separate chambers 41 and 43 for compressed air between the adjusting tube and the outer tube. Each chamber is provided with a separate inlet 50, 52 for introduction of compressed air, each source of air being regulated independently of the other, by valves 51, 53, see FIG. 1.

In operation, the hollow wire helix 36, as further illustrated in FIG. 4, is driven by motor 55 so that it rotates within the seasoning conduit 32, to move the seasoning out of hopper 37, into the seasoning conduit 32. Continuous rotation of the helix prevents build-up of seasoning which might otherwise clog the opening or slit 34. The adjusting tube 38 may be rotated by lever 54 to vary the effective width of the opening 34 which also alters the width of the curtain of seasoning which falls from this slot. Lever 56 locks adjusting tube 38 into the desired position. The thickened portions 58 of the inner ends of the slot in the outer tube 42 which are closely spaced from the adjusting tube 40 cause an increase in the velocity of the compressed air as it exits from the narrow opening and causes it to hug the surface of the adjusting tube 40 using the coanda effect.

Compressed air is supplied to the compartments 41, 43 and exits the space between the thickened portions 58 of the outer wall 42 and the outer surface of tube 38 to follow the wall of tube 38 and meet below opening 34. Where the two streams of air meet, a zone of turbulence 16 is produced. The seasoning falling out of the tube 32 by gravity encounters the zone of turbulence which imparts a horizontal direction to the seasoning causing it to disperse over a wider area forming a wider curtain of seasoning. For instance, by the time the curtain of seasoning reaches the upper surface of the snack the dispersion zone may be several centimeters wide along the full length of the seasoning tube 14 rather than one to five millimeters which would occur if compressed air was not used to produce a zone of turbulence.

Since the air pressure in each chamber 41, 43 and the velocity of the two streams of compressed air are controlled independently of each other, they can be controllably adjusted to impart a desired direction or width to the curtain of falling seasoning. Thus, altering the air pressure by valves 51 and 53 will modify the distribution width of the curtain of seasoning and throw the pattern of seasoning distribution from one side of a vertical plane from the slot opening to the other. Selection of the proper pressures will depend on the kind of seasoning used, its weight and the desired distribution on the snack. The seasoner is preferably positioned approximately 20 centimeters or more above the conveyor on which the snack rests. The height may be altered to vary the coverage of the snack by the seasoning.

By using the equipment described above to distribute seasoning onto a snack product, such as potato chips or corn chips, a desirable uniform coverage is achieved without breakage of the snack and without significant loss of the seasonings into the atmosphere. Avoiding the loss of seasoning to the atmosphere enables use of the invention in an open area of a plant rather than in a closely confined space. It will be appreciated that the process and apparatus described herein may be modified in a variety of ways without departing from the spirit of the invention disclosed above.

What is claimed is:

1. A seasoning distributor apparatus for controllably distributing seasoning falling onto a snack product comprising:
    opposite wall means defining a seasoning outlet therebetween and through which seasoning is discharged to fall onto the snack product,
    means for directing at least two streams of air along the respective opposite wall means toward the seasoning outlet to meet the falling seasoning below the seasoning outlet and above the snack products, and
    means for controlling the streams of air to control and modify the distribution of the seasoning falling from the seasoning outlet.

2. A seasoning distributor apparatus for seasoning a snack product comprising:
    a length of seasoning tube having a seasoning outlet for being disposed over the snack product; and
    an outer tube substantially surrounding said seasoning tube, the outer tube forming two separate compartments for receiving compressed air between the outer tube and the seasoning tube, each compartment of the outer tube having a space between said outer tube and said seasoning tube adjacent to said seasoning outlet through which air under pressure exits each compartment to create streams of air directed toward seasoning falling from the seasoning outlet onto the snack product to control and modify the distribution of the falling seasoning.

3. A seasoning distributor as recited in claim 2 and further comprising an adjusting tube between the outer tube and the seasoning tube, and substantially surrounding the seasoning tube; the adjusting tube having an opening for controllably adjusting the seasoning outlet.

4. A seasoning return apparatus for distributing seasoning onto a lower side of snack products carried on a moving carrier, the seasoning return being positioned below the carrier, the apparatus comprising:

(a) a trough having an upper surface for receiving excess falling seasoning, said upper surface including a portion extending upwardly toward the carrier; and (b) means for directing an air stream along the upper surface portion of the trough to carry seasoning falling on the upper surface along the upward extending surface portion and against the lower side of the snack products.

5. A seasoning return apparatus for distributing seasoning onto a lower side of snack products, as recited in claim 4 wherein said trough is shaped like a rounded L.

6. A seasoning return apparatus for distributing seasoning onto a lower side of snack products carried on a moving carrier, the seasoning return being positioned below the carrier, the apparatus comprising:

(a) a U-shaped trough for receiving excess falling seasoning and directing air and seasoning upward towards said snack products; and (b) means for directing compressed air onto and along the upper surface of the trough.

7. A seasoning return for distributing seasoning onto a lower side of snack products, as recited in claim 6 wherein two U-shaped troughs are positioned adjacent each other, leaving a space between adjacent walls of said troughs through which compressed air passes in an upward direction, and a cover is positioned above the space.

8. An apparatus for applying seasoning from a seasoning outlet to an edible snack product, said product being positioned on a movable open surface conveyor, said apparatus comprising:

(a) a seasoning distributor positioned above said snack product for dispensing a curtain of seasoning by gravity fall;

(b) means for creating two intersecting streams of air directed toward the curtain of seasoning from opposite sides thereof;

(c) means for controlling the air pressure of the intersecting streams to control the curtain of falling seasoning; and (d) air operated seasoning return means positioned below the open surface conveyor and including a trough with upper surface means positioned vertically below the seasoning distributor for collecting falling seasoning passing through the conveyor from the curtain with a portion of the upper surface means extending upwardly, said air operated seasoning return means further including means for directing an air stream along the upper surface means to carry the collected fallen seasoning along the upward extending upper surface means portion and against the snack product.

9. An apparatus as recited in claim 8 wherein said seasoning return further comprises a cover and means for directing compressed air into the trough.

10. An apparatus as recited in claim 9 wherein said trough is shaped like a rounded L.

11. An apparatus for applying seasoning from a seasoning outlet to an edible snack product, said product being positioned on a movable open surface conveyor comprising:

(a) a seasoning distributor positioned above said snack product for dispensing a curtain of seasoning by gravity fall;

(b) means for creating two intersecting streams of air directed toward the curtain of seasoning from opposite sides thereof;

(c) means for controlling the air pressure of the intersecting streams to control the curtain of falling seasoning; and (d) air operated seasoning return means positioned below the open surface conveyor and including (1) a U-shaped trough for collecting falling seasoning, (2) a cover and (3) means for directing compressed air into the trough and for directing the air and fallen seasoning upwardly towards the snack products on the open surface conveyor.

12. A seasoning apparatus as recited in claim 11 wherein two U-shaped troughs are positioned adjacent each other, leaving a space between adjacent walls of said troughs through which compressed air passes in an upward direction, and a cover positioned above the space.

13. An apparatus for applying seasoning from a seasoning outlet to an edible snack product, said product being positioned on a movable open surface conveyor comprising:

(a) a seasoning distributor positioned above said snack product for dispensing a curtain of seasoning by gravity fall, the seasoning distributor being a tube with a longitudinal slit extending the length thereof through which seasoning may fall;

(b) means for creating two intersecting streams of air directed toward the curtain of seasoning from opposite sides thereof, and including an outer tube attached to the seasoning tube having separate compartments to be supplied with compressed air, and a longitudinal opening from each compartment corresponding to the slit for creating the intersecting streams;

(c) means for controlling the air pressure of the intersecting streams to control the curtain of falling seasoning; and (d) air operated seasoning return means positioned below the open surface conveyor and including (1) a trough for collecting falling seasoning; (2) a cover and (3) means for directing compressed air into the trough, and for directing the air and fallen seasoning upwardly towards the snack products on the open surface conveyor.

* * * * *